(12) United States Patent
Zhong et al.

(10) Patent No.: US 9,435,957 B1
(45) Date of Patent: Sep. 6, 2016

(54) CYCLIC DEMULTIPLEXER WITH GRATING AND MIRROR ARRAY

(71) Applicant: CoAdna Photonics Inc., Sunnyvale, CA (US)

(72) Inventors: Shan Zhong, Clarksville, MD (US); Shijun (Shawn) Xiao, Fremont, CA (US)

(73) Assignee: Coadna Photonics Inc., Sunnyvale, CA (US)

( * ) Notice: Subject to any disclaimer, the term of this patent is extended or adjusted under 35 U.S.C. 154(b) by 441 days.

(21) Appl. No.: 14/074,553

(22) Filed: Nov. 7, 2013

Related U.S. Application Data

(60) Provisional application No. 61/723,726, filed on Nov. 7, 2012.

(51) Int. Cl.
*G02B 6/293* (2006.01)
*G02B 6/12* (2006.01)

(52) U.S. Cl.
CPC ......... *G02B 6/2931* (2013.01); *G02B 6/29305* (2013.01); *G02B 2006/12164* (2013.01)

(58) Field of Classification Search
CPC ............ G02B 6/29305; G02B 6/2931; G02B 2006/12164
USPC ........................................ 385/18, 22, 37, 47
See application file for complete search history.

(56) References Cited

U.S. PATENT DOCUMENTS

| | | | |
|---|---|---|---|
| 6,483,962 B1* | 11/2002 | Novotny | G02B 6/32 359/224.1 |
| 2002/0196520 A1* | 12/2002 | Marom | G02B 6/2931 359/290 |
| 2010/0202778 A1* | 8/2010 | Wisseman | G02B 6/2931 398/83 |

* cited by examiner

*Primary Examiner* — Ryan Lepisto
(74) *Attorney, Agent, or Firm* — Cooley LLP

(57) ABSTRACT

A demultiplexer includes an input optical link to receive an input signal. A grating receives the input signal from the input optical link and generates individual optical wavelength signals. A mirror array operative as a beam steering engine receives the individual optical wavelength signals and redirects them to the grating. Output optical links receive the individual optical wavelength signals from the grating.

13 Claims, 4 Drawing Sheets

CYCLIC DEMULTIPLEXER WITH GRATING AND MIRROR ARRAY

CROSS-REFERENCE TO RELATED APPLICATION

This application claims priority to U.S. Provisional Patent Application Ser. No. 61/723,726, filed Nov. 7, 2012, the contents of which are incorporated herein by reference.

FIELD OF THE INVENTION

The present invention relates generally to optics, fiber optics, and optical communications. More particularly, the invention is directed toward a cyclic demultiplexer with a grating and mirror array.

BACKGROUND OF THE INVENTION

A passive optical network (PON) features a point-to-multi-point (P2MP) architecture to provide broadband access. In particular, a single optical link has an optical splitter to branch optical signals to multiple premises.

The P2MP architecture has become the most popular solution for FTTx deployment among network operators. FTTx stands for "Fiber to the x", which is a reference to any broadband network architecture using optical fiber to replace all or part of the metal local loop used for last-mile telecommunications.

PON-based FTTx has been widely deployed ever since 2004. Most of these PON systems are based on the standards of G-PON or E-PON. To meet the growing capacity demands driven by bandwidth-intensive applications, the 10 Gbps based PON technology (XG-PON1) was standardized in 2007 and is now ready for deployment to expand current communication capacities by factor of 4.

The FSAN Group (www.fsan.org) is now focusing on a future generation of access solutions named NG-PON2. This new technology, targeting standardization in 2012-2013 and commercial deployment in 2015, should be able to expand fiber capacity by another factor of 4 or more to achieve at least 40 Gbps downstream and 10 Gbps upstream. This will pave the way for provisioning of even higher bandwidth services in the future.

Among many proposals to meet the NG-PON2 criteria, wavelength-division multiplexing (WDM) stacked XG-PON is the only one that has been selected by FSAN to move into the standardization process. FIG. 1 shows the basic architecture 100 of this WDM stacked XG-PON proposal for NG-PON2. NG-PON2 introduced WDM signals into the system, where 4-16 wavelengths at 100 GHz spacing could be used for both down-stream and up-stream transmission. For a system with 4 wavelengths, a 1×4 cyclic demultiplexer or demux 102 is equipped in the central office (CO) 104 and is connected to 4 optical line termination (OLT) transceivers 106. For down-stream communications, the OLT transmitters are set to 4 fixed wavelengths in the down-stream band though each of the OLT transmitters could be wavelength tunable. At the optical network unit (ONU) side 108, a built-in tunable optical filter (TOF) is responsible for selecting one of the 4 wavelengths for the ONU receiver. For up-stream communications, the ONU transmitter should have wavelength tunability to communicate with any one of the 4 OLT receivers. To minimize the cost of an ONU transmitter, distributed feedback (DFB) lasers are used; wavelength tunability is achieved through thermal tuning. Since most DFBs have a tuning range of 3-4 nm where their center wavelength could distribute over a wider wavelength range, a 1×4 cyclic demux is a solution to connect each DFB laser to any OLTs it wants to reach by setting it to the right wavelength, as shown in FIG. 2.

Currently, cyclic demultiplexers are implemented using a cascade of 1×2 inter-leavers. That is, 1×2 inter-leavers are used as the building block for higher port count (1×4 or 1×8) cyclic demultiplexers. For example, a 1×4 cyclic demultiplexer can be achieved through 2 stage, 3 inter-leavers, though the two stages will have different free spectral ranges. This solution is relatively expensive and is otherwise not scalable.

Another architectural approach is arrayed waveguide grating. An arrayed waveguide grating can achieve 1×N or even N×N cyclic function on a monolithic chip. Unfortunately, current cyclic arrayed waveguide grating designs suffer higher insertion loss (>4 dB) and narrower bandwidth, particularly when the free spectral range is limited to 400 GHz-800 GHz.

Consequently, new techniques are required for cyclic demultiplexers. Ideally, such techniques will provide a low cost solution, low insertion loss and a wide passband.

SUMMARY OF THE INVENTION

A demultiplexer includes an input optical link to receive an input signal. A grating receives the input signal from the input optical link and generates individual optical wavelength signals. A mirror array operative as a beam steering engine receives the individual optical wavelength signals and redirects them to the grating. Output optical links receive the individual optical wavelength signals from the grating.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
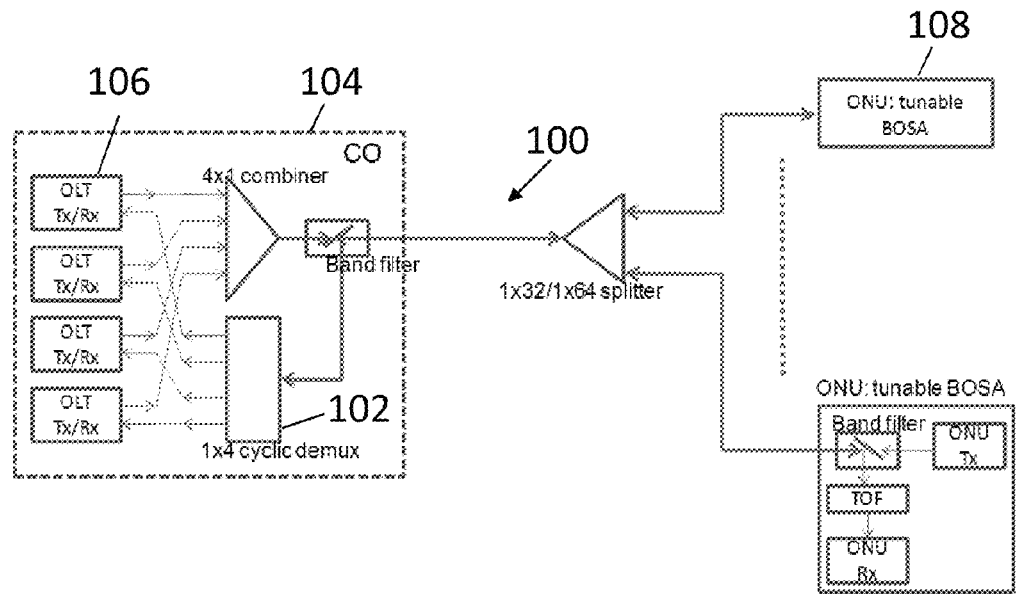
FIG. 1 shows the basic architecture for a wavelength division multiplexer communication network.
Figure 2:
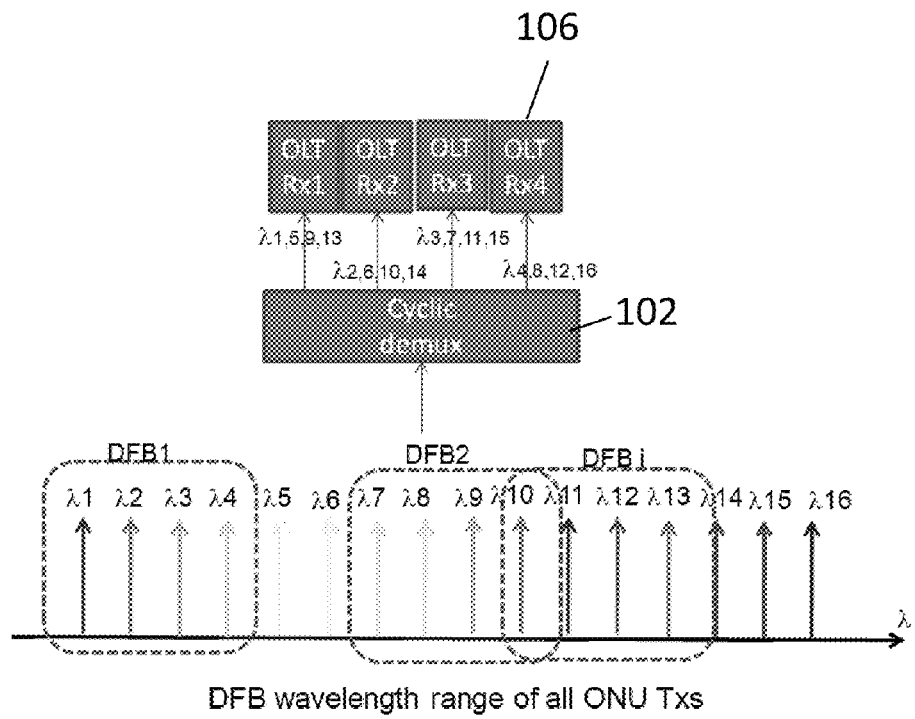
FIG. 2 illustrates a cyclic demultiplexer processing distributed feedback laser signals.
Figure 3:
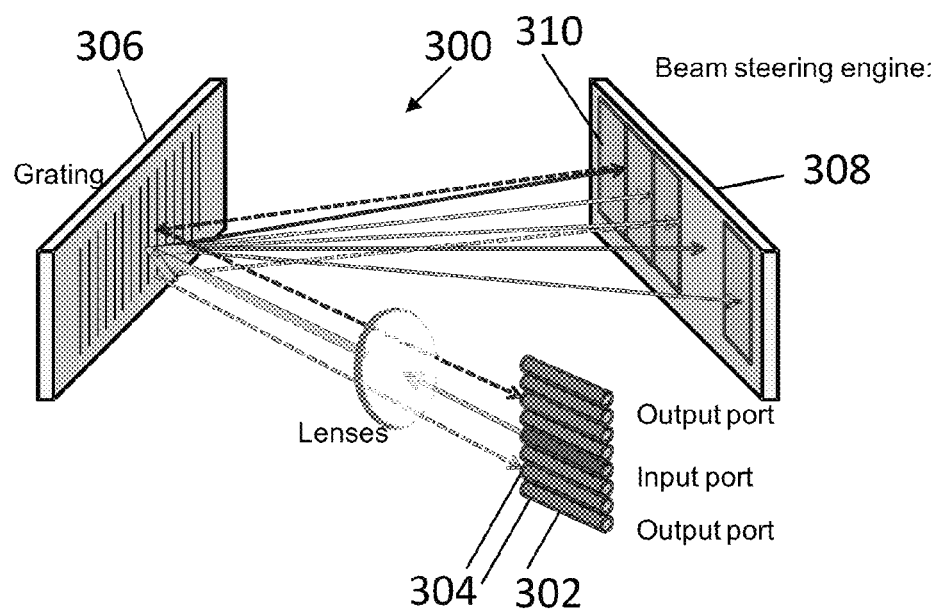
FIG. 3 illustrates a wavelength selective switch configured as a cyclic demultiplexer in accordance with an embodiment of the invention.

FIG. 3 illustrates a 1×N cyclic demultiplexer 300. The cyclic demultiplexer 300 includes an aligned set of optical links including an input port 302 and N output ports 304. An input signal is applied to a grating 306, which divides the signal into many wavelength components, which are applied to a beam steering engine 308. The beam steering engine 308 reflects the wavelength signals back to the grating 306, which directs the signals to output ports 304.

The multiplexer 300 has the architecture of a 1×N wavelength selective switch. All wavelength channels are input from a common input port 302, and they are demultiplexed by a diffraction grating 306 onto a group of pixels 310 of a reconfigurable beam steering engine 308. Thus, different wavelength channels can be controlled by one or a few pixels. The beam steering engine 308 can selectively switch any wavelength channels to any of the N output ports 304.

An aspect of the invention is a grating based cyclic demultiplexer that shares grating based wavelength selective switch optics. Another aspect of the invention is the cost savings achieved by replacing a regular 1×N wavelength selective switch with fixed cyclic mirror arrays.

There are many ways to build a low cost mirror array that follows a cyclic sequence. One such implementation is a mirror stack configuration, as shown in FIGS. 4-8.

Figure 4:
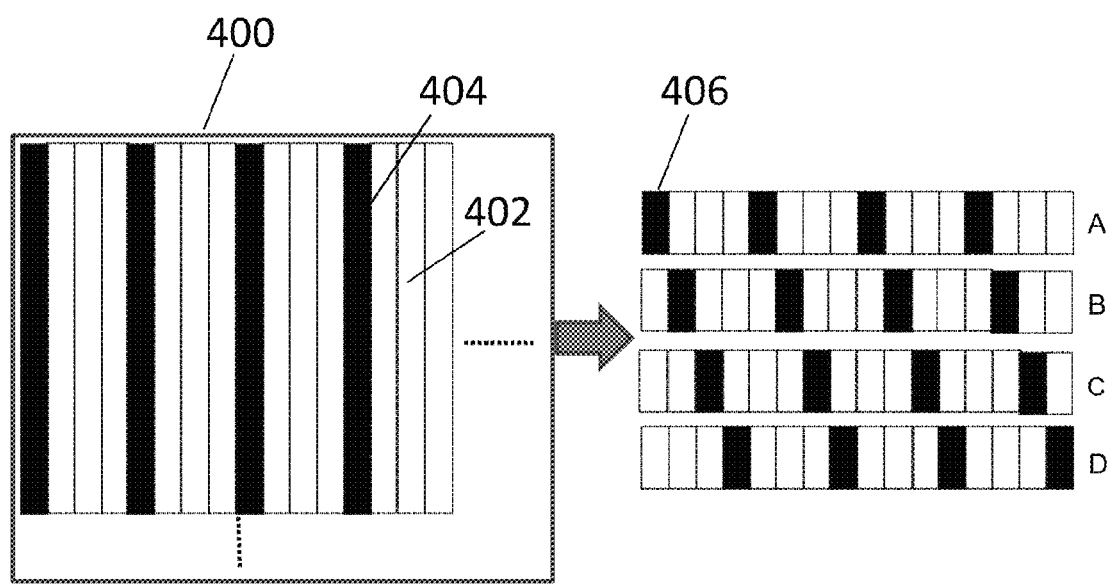
FIGS. 4-8 are different views of a cyclic mirror used in the device of FIG. 3.

FIG. 4 illustrates a transparent glass plate 400 coated with a uniform anti-reflective coating 402 on both sides and patterned high-reflective coating 404 on one side of the glass. Each high-reflective pixel 406 is used as a one mirror pixel to reflect the beam back to the desired port. Similar to a wavelength selective switch, each wavelength channel is mapped onto one pixel by the grating demultiplexer. The glass plate is aligned to reflect a group of cyclic channels to one output port. By stacking several glass plates with shifted pixels, e.g., A, B, C and D in FIG. 4, in a sequence with controlled adjacent angles between plates, a 1×4 cyclic demultiplexer can be implemented. The adjacent angle is determined by the adjacent port spacing in the optical system. This stack can be scaled up for higher port counts.

Figure 5:
Figure 6:
Figure 7:
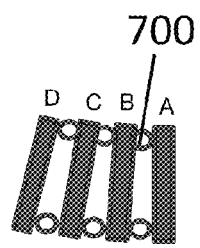
Figure 8:
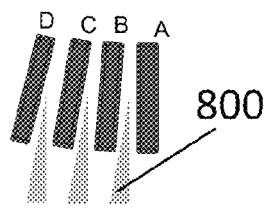

FIG. 5 illustrates the detailed mirror stack for a 1×4 cyclic demux with 16 wavelength channels. This front view of the stack shows 16 high-reflective pixels 406 aligned and stitched together for continuous wavelength channels. The top view in FIG. 6 shows 4 mirrors stacked with one pixel shift between adjacent mirror plates. The side views of FIGS. 7 and 8 show adjacent angle control of the 4 mirror plates. One method of angle control is to use two glass tubes 700 with different diameters between two adjacent plates so that a desired angle can be formed. Another possible method is to use a glass wedge 800 between adjacent plates, where the glass wedge has a desired angle.

Figure 9:
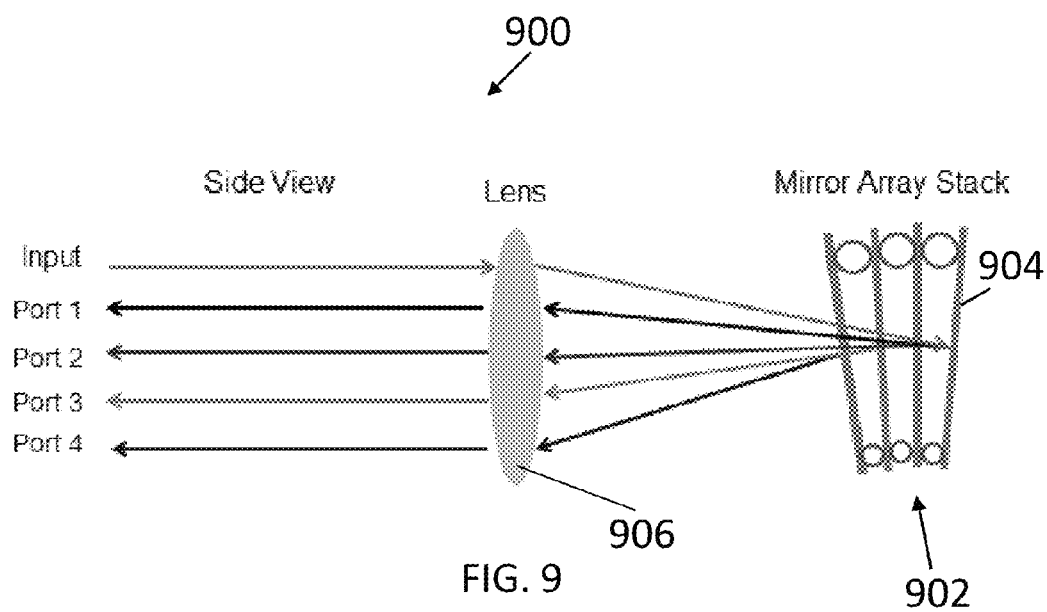
FIG. 9 illustrates 1×4 cyclic demultiplexer utilized in accordance with an embodiment of the invention.

FIG. 9 shows a 1×4 cyclic demux 900 with cyclic mirror array stack 902. The beam of different wavelength channels is statically steered to different ports by different fixed cyclic mirrors 904. A lens 906 and other optic components may also be provided.

In one embodiment, a mirror array is constructed from laser machined glass. That is, a number of mirror array chips are laser machined on a glass wafer. Each chip has periodically angled mirrors with a highly reflective coating.

Those skilled in the art will appreciate that the disclosed cyclic demultiplexer is low cost, has high performance with a low insertion loss and a wide passband, and provides configuration flexibility.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A demultiplexer, comprising:
   an input optical link to receive an input signal;
   a grating to receive the input signal from the input optical link and generate a plurality of individual optical wavelength signals;
   a mirror array operative as a beam steering engine to receive the individual optical wavelength signals and redirect them to the grating, wherein the mirror array includes stacked glass plates, wherein each stacked glass plate has selectively positioned high-reflective coatings operative as mirror pixels; and
   a plurality of output optical links to receive the individual optical wavelength signals from the grating.

2. The demultiplexer of claim 1 wherein the mirror array is laser machined on a glass wafer.

3. The demultiplexer of claim 2 wherein the mirror array has periodically angled mirrors with a highly reflective coating.

4. The demultiplexer of claim 1 wherein the input optical link and the plurality of output optical links are vertically aligned.

5. The demultiplexer of claim 1 in combination with an optical line termination transceiver.

6. A demultiplexer, comprising:
   an input optical link to receive an input signal;
   a grating to receive the input signal from the input optical link and generate a plurality of individual optical wavelength signals;
   a mirror array operative as a beam steering engine to receive the individual optical wavelength signals and redirect them to the grating, wherein the mirror array includes stacked glass plates, wherein each stacked gas plate has a selectively positioned anti-reflective coating; and
   a plurality of output optical links to receive the individual optical wavelength signals from the grating.

7. The demultiplexer of claim 6 wherein the mirror array is laser machined on a glass wafer.

8. The demultiplexer of claim 7 wherein the mirror array has periodically angled mirrors with a highly reflective coating.

9. The demultiplexer of claim 6 wherein the input optical link and the plurality of output optical links are vertically aligned.

10. The demultiplexer of claim 6 in combination with an optical line termination transceiver.

11. A demultiplexer, comprising:
    an input optical link to receive an input signal;
    a grating to receive the input signal from the input optical link and generate a plurality of individual optical wavelength signals;
    a mirror array operative as a beam steering engine to receive the individual optical wavelength signals and redirect them to the grating, wherein the mirror array includes spacers between stacked glass plates, wherein the spacers are configured to form desired angles between the stacked glass plates;
    a plurality of output optical links to receive the individual optical wavelength signals from the grating.

12. The demultiplexer of claim 11 wherein the spacers are tubes.

13. The demultiplexer of claim 11 wherein the spacers are wedges.

* * * * *